United States Patent
Ikuma et al.

(10) Patent No.: US 11,970,017 B2
(45) Date of Patent: Apr. 30, 2024

(54) BADGE AND MANUFACTURING METHOD OF THE SAME

(71) Applicant: TOYOTA JIDOSHA KABUSHIKI KAISHA, Aichi-ken (JP)

(72) Inventors: Masami Ikuma, Toyota (JP); Simon Humphries, Aichi-ken (JP); Hiroshi Tomita, Okazaki (JP); Daiki Isogai, Aichi-ken (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/320,204

(22) Filed: May 19, 2023

(65) Prior Publication Data
US 2023/0406022 A1    Dec. 21, 2023

(30) Foreign Application Priority Data
May 20, 2022    (JP) .................................. 2022-082754

(51) Int. Cl.
   *B41M 7/00*    (2006.01)
(52) U.S. Cl.
   CPC ................................. *B41M 7/0027* (2013.01)
(58) Field of Classification Search
   CPC ................................................... B41M 7/0027
   USPC ............................................................ 428/203
   See application file for complete search history.

(56) References Cited

U.S. PATENT DOCUMENTS

| | | | | |
|---|---|---|---|---|
| 2003/0194532 A1* | 10/2003 | Schulz | ................ | B41M 7/0027 |
| | | | | 428/119 |
| 2012/0227251 A1 | 9/2012 | Hyuga et al. | | |
| 2015/0138796 A1* | 5/2015 | Salter | .................. | B60Q 1/0011 |
| | | | | 362/510 |
| 2020/0011502 A1* | 1/2020 | Nicholson | ............. | F21S 43/237 |

FOREIGN PATENT DOCUMENTS

| | | |
|---|---|---|
| JP | 2008-044147 A | 2/2008 |
| JP | 2019-188609 A | 10/2019 |
| JP | 2021-175995 A | 11/2021 |
| JP | 2021-175996 A | 11/2021 |
| WO | 2012/011282 A1 | 1/2012 |

OTHER PUBLICATIONS

Blog of Hata Precision Industry Co., Ltd, Dec. 25, 2017, URL: https://t-nakamura-hata.amebaownd.com/posts/3436646/, 4pp.
Yoshida, Web News for Nikkei XTECH, Jun. 26, 2019, URL: https://xtech.nikkei.com/atcl/nxt/mag/nmc/18/00012/00073/, 6pp.

* cited by examiner

*Primary Examiner* — Betelhem Shewareged
(74) *Attorney, Agent, or Firm* — HAUPTMAN HAM, LLP

(57) ABSTRACT

A badge has a print layer and a substrate that is a processed layer. The print layer is printed with a subject image in which a radial center point is defined as a center point of a radial representation. The substrate has a circular brushed surface that is subjected to circular processing. At least one of the print layer and the substrate is light transmissive. The print layer is laminated on the circular brushed surface side of the substrate such that the radial center point of the subject image and a circular processing center point that is a center point of the circular processing coincide with each other.

7 Claims, 13 Drawing Sheets

BADGE AND MANUFACTURING METHOD OF THE SAME

CROSS REFERENCE TO RELATED APPLICATION

This application claims priority to Japanese Patent Application No. 2022-82754, filed on May 20, 2022, which is incorporated herein by reference in its entirety including the specification, claims, drawings, and abstract.

TECHNICAL FIELD

The present description discloses a badge and a method of manufacturing the badge.

BACKGROUND

Circular processing has been known as a process of decorating metal parts and the like. Circular processing, also referred to as circular brushing, is a machining technique of providing an exposed surface of a metal part with lines in a concentric circle or spiral pattern. Exposure of the resulting circular brushed surface to light produces a visual effect as if light were diffused radially from the center of the concentric circle or spiral pattern.

For example, the Internet site <https://t-nakamura-hata.amebaownd.com/posts/3436646/> describes performing circular processing on an exposed surface of a knob (control) for input/output adjustment of an audio set or electronic musical instrument. The Internet site <https://xtech.nikkei.com/atcl/nxt/mag/nmc/18/00012/00073/>, JP 2021-175995 A, and JP 2021-175996 A also disclose examples in which a metallic print is printed on a transparent base material, such as a resin film, and a surface (exposed surface) of this transparent base material is subjected to decoration processing, such as hairline finishing or circular processing.

In WO 2012/011282, a pushbutton switch is subjected to circular processing. JP 2019-188609 A discloses an example where a surface of a plastic sheet is subjected to circular processing. JP 2008-044147 A discloses an anti-counterfeiting card with a relief structure-forming layer having a concave-convex structure on its surface and a reflective layer covering the concave-convex structure.

The present description discloses a badge which uses the decoration effect caused by a circular brushed surface and a method of manufacturing the badge.

SUMMARY

The present description discloses a badge. This badge has a print layer and a processed layer. The print layer is printed with a subject image in which a radial center point is defined as a center point of a radial representation. The processed layer has a circular brushed surface that is subjected to circular processing. At least one of the print layer and the processed layer is light transmissive. The print layer is laminated on the circular brushed surface side of the processed layer such that the radial center point of the subject image and a circular processing center point that is a center point of the circular processing coincide with each other.

This configuration allows the radial representation in the subject image to be replaced or enhanced by an optical radiation and diffusion effect caused by the circular brushed surface.

In the above configuration, the subject image may include a light source image. In this case, the print layer and the processed layer are laminated such that the radial center point defined in the light source image and the circular processing center point coincide with each other.

This configuration allows for a visual effect as if light were emitted from the light source image due to the optical radiation and diffusion effect caused by the circular brushed surface.

In the above configuration, the subject image may include an idol image. In this case, the print layer and the processed layer are laminated such that the radial center point defined with respect to the idol image and the circular processing center point coincide with each other.

This configuration makes it possible to express bright rays from religious idols or the so-called "aura" of celebrities by using the optical radiation and diffusion effect caused by the circular brushed surface.

In the above configuration, the subject image may include a moving body image. In this case, the print layer and the processed layer are laminated such that the radial center point of radial speed lines defined with respect to the moving body image and the circular processing center point coincide with each other.

This configuration allows the speed lines from the moving body to be replaced or enhanced by the optical radiation and diffusion effect caused by the circular brushed surface.

In the above configuration, the processed layer may be a non-light transmissive substrate. In this case, the light transmissive print layer is laminated on the circular brushed surface of the processed layer. A light transmissive protective layer is laminated on the print layer.

This configuration makes it possible to manufacture a badge by using a method commonly used as a badge manufacturing method including, for example, applying circular processing to a substrate surface, laminating a print layer on the resulting surface, and further laminating a clear coat layer on the print layer.

In the above configuration, the processed layer may be a light-transmissive protective layer. In this case, the print layer is laminated on a substrate, and the processed layer is laminated on the print layer.

In this configuration, the circular brushed surface is provided in the protective layer that can be a top layer, and therefore, manufacturing steps before those for the top layer can be shared between badges to be subjected to circular processing and badges not to be subjected to circular processing.

In the above configuration, radial lines do not have to be drawn on the print layer.

In the presence of the optical radiation and diffusion effect caused by the circular brushed surface, the state of optical radiation and diffusion dynamically changes depending on the angle of light incidence and the angle from which the badge is viewed. On the other hand, when radial lines are printed on the print layer, those radial lines remain at their fixed positions in the subject image regardless of the angle from which the badge is viewed. By omitting these printed radial lines from the print layer, it becomes possible to avoid the mixture of static and dynamic radial lines.

In the above configuration, the print layer and the processed layer may have a disk shape. In this case, the radial center point of the print layer and the circular processing center point of the processed layer are defined at a position shifted from disk center points of the print layer and the processed layer.

This configuration allows for a visual effect of light emission from a position deviated from the disk center point.

The present description also discloses a method of manufacturing the badge. This method includes the step of printing, on a print layer, a subject image in which a radial center point is defined as a center point of a radial representation. This method also includes the step of performing circular processing on a surface to be circular brushed of the processed layer. At least one of the print layer and the processed layer is light transmissive. This method also includes the step of laminating the print layer on the circular brushed surface side of the processed layer such that the radial center point of the subject image and a circular processing center point that is a center point of the circular processing coincide with each other.

In the above configuration, the subject image may include a light source image. In this case, the print layer and the processed layer are laminated such that the radial center point defined in the light source image and the circular processing center point coincide with each other.

In the above configuration, the subject image may include an idol image. In this case, the print layer and the processed layer are laminated such that the radial center point defined with respect to the idol image and the circular processing center point coincide with each other.

In the above configuration, the subject image may include a moving body image. In this case, the print layer and the processed layer are laminated such that the radial center point of radial speed lines defined with respect to the moving body image and the circular processing center point coincide with each other.

In the above configuration, the processed layer may be a non-light transmissive substrate. In this case, the light transmissive print layer is laminated on the circular brushed surface of the processed layer. The light transmissive protective layer is laminated on the print layer.

In the above configuration, the processed layer may be a light-transmissive protective layer. In this case, the print layer is laminated on a substrate, and the processed layer is laminated on the print layer.

In the above configuration, radial lines do not have to be drawn on the print layer.

In the above configuration, the print layer and the processed layer may have a disk shape. In this case, the radial center point of the print layer and the circular processing center point of the processed layer are defined at a position shifted from disk center points of the print layer and the processed layer.

The badge and the method of manufacturing the badge make it possible to use the decoration effect caused by the circular brushed surface made in the manufacturing process of the badge.

BRIEF DESCRIPTION OF DRAWINGS

An embodiment of the present disclosure will be described based on the following figures, wherein.

DESCRIPTION OF EMBODIMENT

Figure 1:
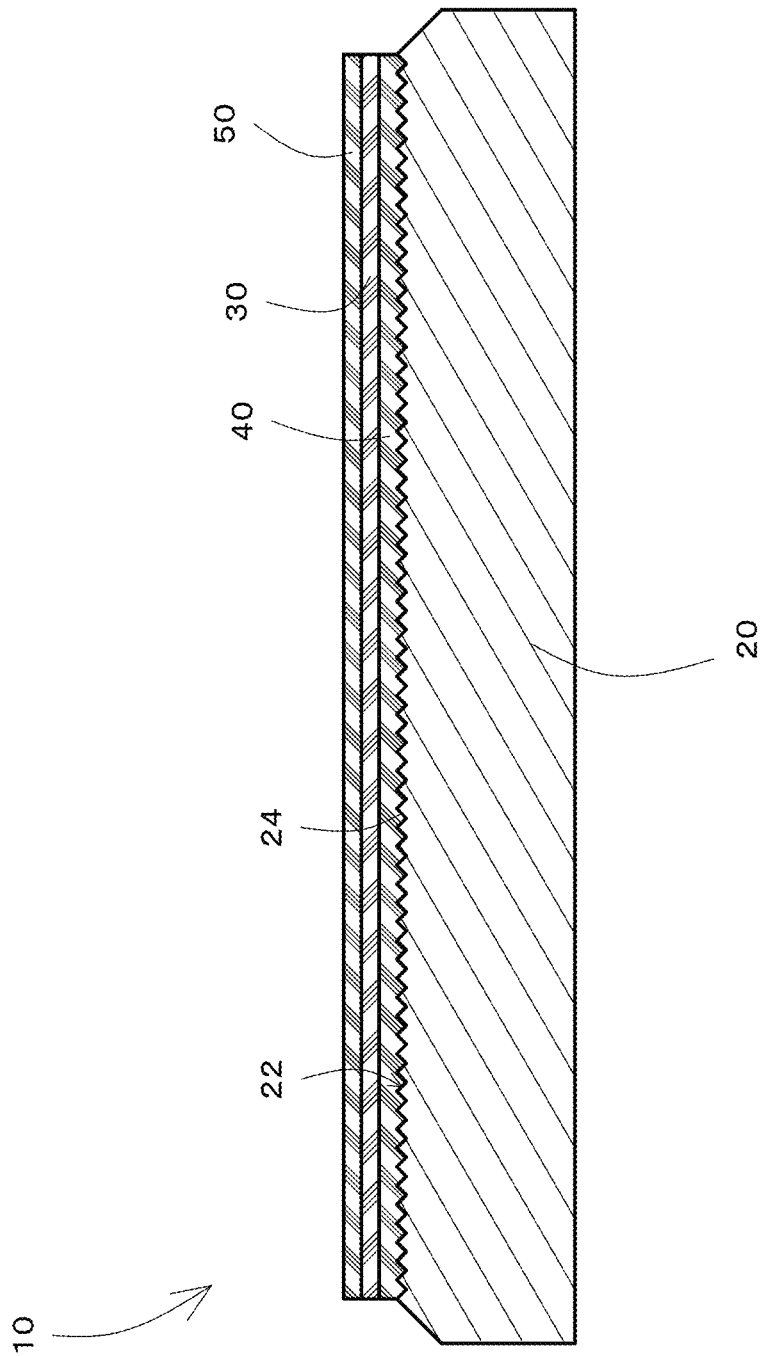
FIG. 1 is a cross-sectional view showing an example of a structure of a badge according to an embodiment.

Hereinafter, a badge according to an embodiment will be described with reference to the drawings. The shapes, materials, number of pieces, and numerical values described below are examples for illustrative purposes and may be modified as required according to the specifications of the badge. The same components are labeled with the same reference numerals in all the figures.

FIG. 1 shows a cross-sectional view of a badge 10 according to an embodiment. The badge 10 is a so-called emblem badge or symbol badge that is attached, for example, to a front grille or exterior panel of a vehicle.

As illustrated in FIG. 1, the badge 10 is a laminated product. For example, in the badge 10, an intermediate protective layer 40 is laminated on a substrate 20 which is a bottom layer. A print layer 30 is then laminated on the intermediate protective layer 40. A surface protective layer 50 is then laminated on the print layer 30. For example, as will be described below, the substrate 20 has a disk shape, and all of the intermediate protective layer 40, the print layer 30, and the surface protective layer 50 laminated on or above the substrate 20 also have a disk shape.

Figure 2:
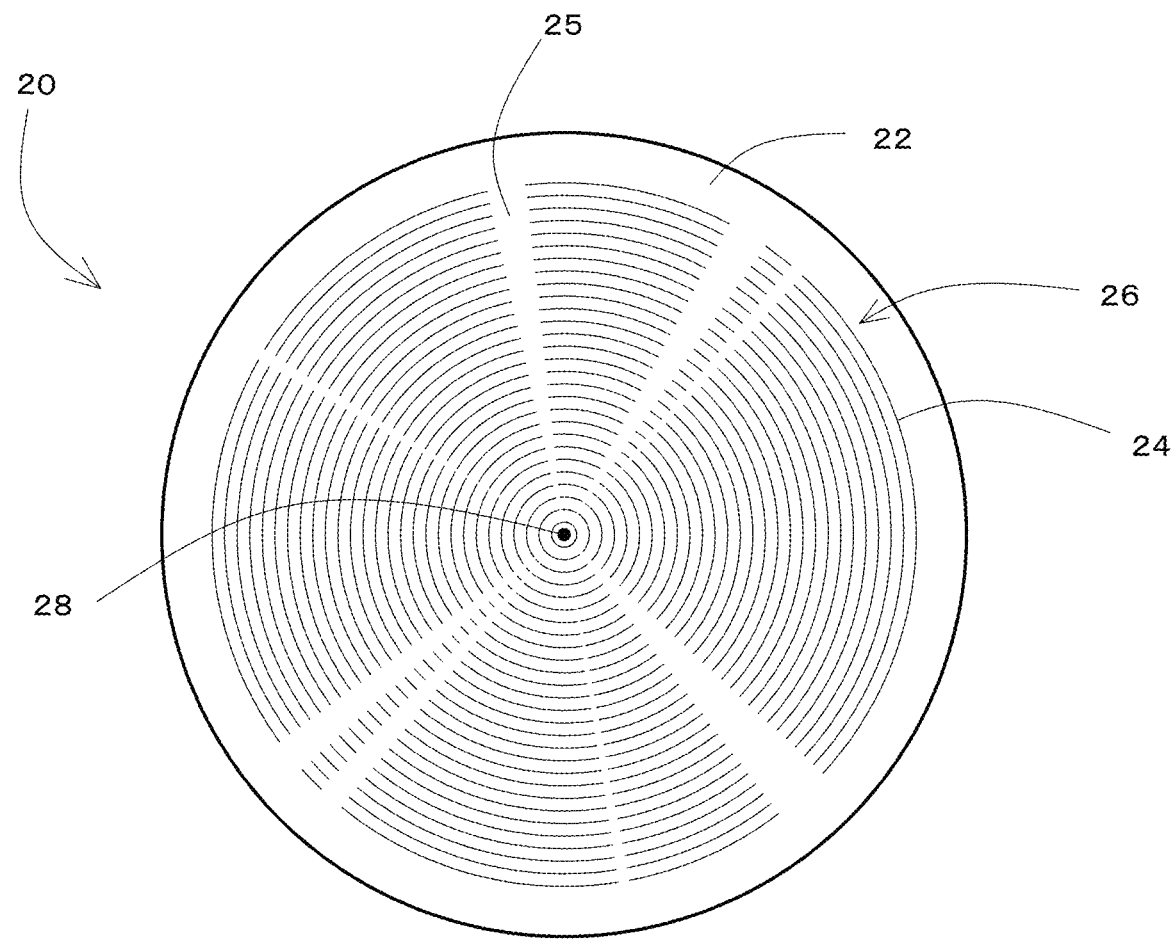
FIG. 2 is a plane view illustrating a circular brushed surface of a substrate.

Referring to FIGS. 1 and 2, the substrate 20 is made of a metallic material, such as, for example, aluminum. In addition, the substrate 20 is formed to have a disk shape. The substrate 20 has disk-shaped surfaces with a metallic glossy texture. One of these opposing disk-shaped surfaces of the substrate 20 is subjected to circular processing. The substrate 20 can thus be regarded as a non-light transmissive processed layer.

Referring to FIG. 2, lines 24 are formed in concentric circles on a circular brushed surface 22, which is the disk-shaped surface of the substrate 20. The resultant concentric circular pattern 26 has, at its center, a circular processing center point 28, and the circular processing center point 28 is positioned so as to coincide (overlap) with a disk center point of the substrate 20, for example.

Although, in FIG. 2, the concentric circle pattern 26 is formed on the circular brushed surface 22, the lines 24 may alternatively be provided in a spiral pattern extending from the circular processing center point 28 toward an outer edge of the disk.

As illustrated in FIG. 2, by providing the circular brushed surface 22, it is possible to obtain a visual effect as if light were diffused radially from the circular processing center point 28 as indicated by diffused light 25 when light is applied to the circular brushed surface 22.

Referring to FIG. 1, the intermediate protective layer 40 is laminated on the circular brushed surface 22 of the substrate 20. The intermediate protective layer 40 may be a light transmissive clear coat layer made of, for example, a resin material. By laminating the intermediate protective layer 40 on the circular brushed surface 22, it is possible to form the print layer 30, which is the next layer, on a smooth surface.

Figure 3:
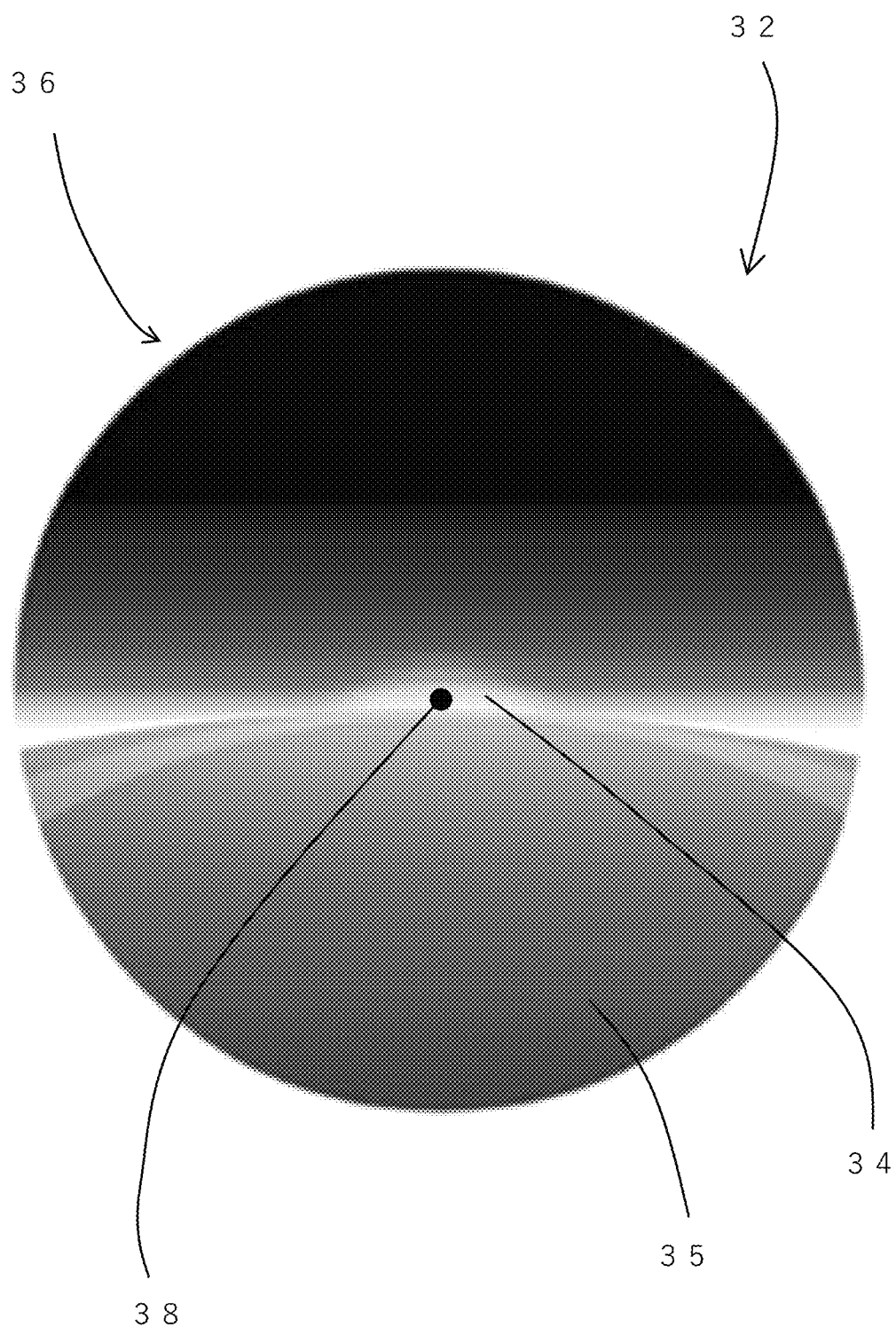
FIG. 3 is a plane view illustrating an example of a subject image.

The print layer 30 is printed with a subject image 32, such as the one illustrated in FIG. 3. The subject image 32 includes, for example, a light source image 34 showing a source of light emission. In FIG. 3, an image of the sun is drawn as an example of the light source. The light source of the light source image 34 does not have to be a light emitter.

As the subject image 32 in FIG. 3, a scene of the sun rising from behind the Earth in the foreground is drawn. The light source image 34 (the sun), an earth image 35, a space image 36, and other images constituting the subject image 32 are all printed with light transmissive paints, for example. For example, dye-based paints are used to make the print layer 30 transmissive (translucent).

In the subject image 32, a radial center point 38 that is a center point of a radial representation is defined. In the example of FIG. 3, the radial center point 38 is defined in the light source image 34.

Referring to FIG. 1, the print layer 30 is laminated on the circular brushed surface 22 side of the substrate 20, which is the processed layer, via the intermediate protective layer 40. The surface protective layer 50 is laminated on the print layer 30. Like the intermediate protective layer 40, the surface protective layer 50 may be a light transmissive clear coat layer made of, for example, a resin material.

The surface protective layer 50 is provided to protect the print layer 30. When the badge 10 is attached to an outer surface of a vehicle body, and the vehicle is washed, there is a risk that the surface of the badge 10 may be scraped with a brush or the like. Covering the print layer 30 with the surface protective layer 50 can reduce such damage to the print layer 30.

Figure 4:
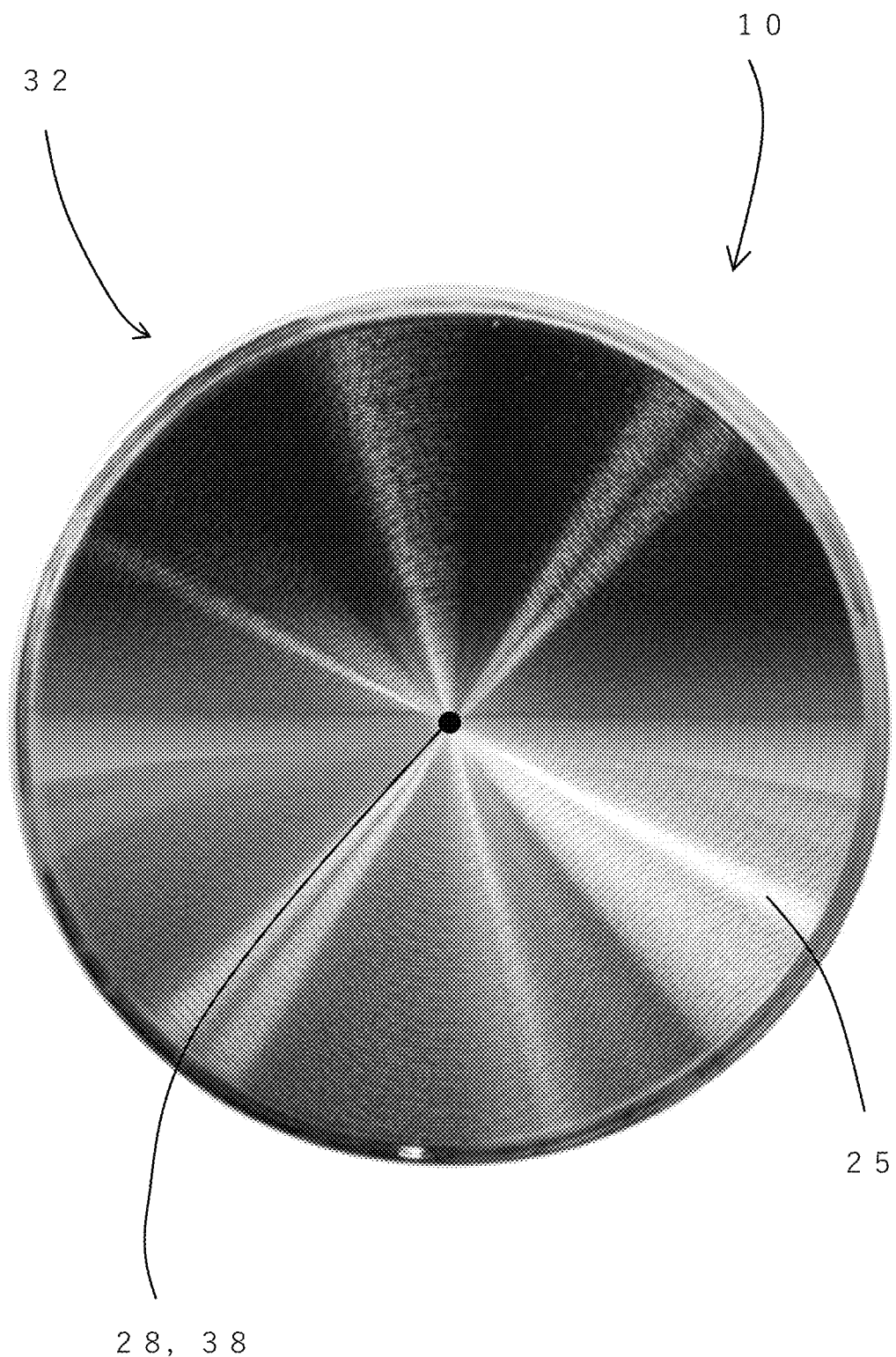
FIG. 4 is a plane view showing an example of a print layer laminated on the circular brushed surface.

FIG. 4 illustrates a plan view of the completed badge 10. The completed badge 10 refers to the badge in which the intermediate protective layer 40, the print layer 30, and the surface protective layer 50 are laminated on or above the circular brushed surface 22 of the substrate 20, as illustrated in FIG. 1.

Referring to FIGS. 2 to 4, the print layer 30 is laminated above the circular brushed surface 22 such that the positions of the radial center point 38 of the subject image 32 and the circular processing center point 28 of the circular brushed surface 22 coincide with each other. Such alignment allows the radial representation in the subject images 32 to be replaced or enhanced by the optical radiation and diffusion effect caused by the circular brushed surface.

In other words, when light is incident on the circular brushed surface 22, which is a glossy surface, the reflected light is visually recognizable as the diffused light 25 in the radial direction around the circular processing center point 28. By coinciding the circular processing center point 28 with the radial center point 38 of the subject image 32, it is possible to obtain a visual effect as if light were emitted from the light source image 34 which is not a light emitter.

The diffused light 25 on the circular brushed surface 22 rotates around the circular processing center point 28 by changing the angle of light incident on the circular brushed surface 22 or the viewing angle of the viewer. In other words, the light that appears to be emitted from the light source image 34 dynamically changes (rotates) in response to changes in the viewing angle of the viewer, for example. Such dynamic changes in the diffused light 25 allow the viewer to feel the depth in the subject image 32.

FIGS. 5 to 10 show alternative examples of the subject image 32. It should be noted that, in these figures, the configuration (laminated structure and the like) other than the subject image 32 may be identical to that in FIGS. 1 to 4.

Figure 5:
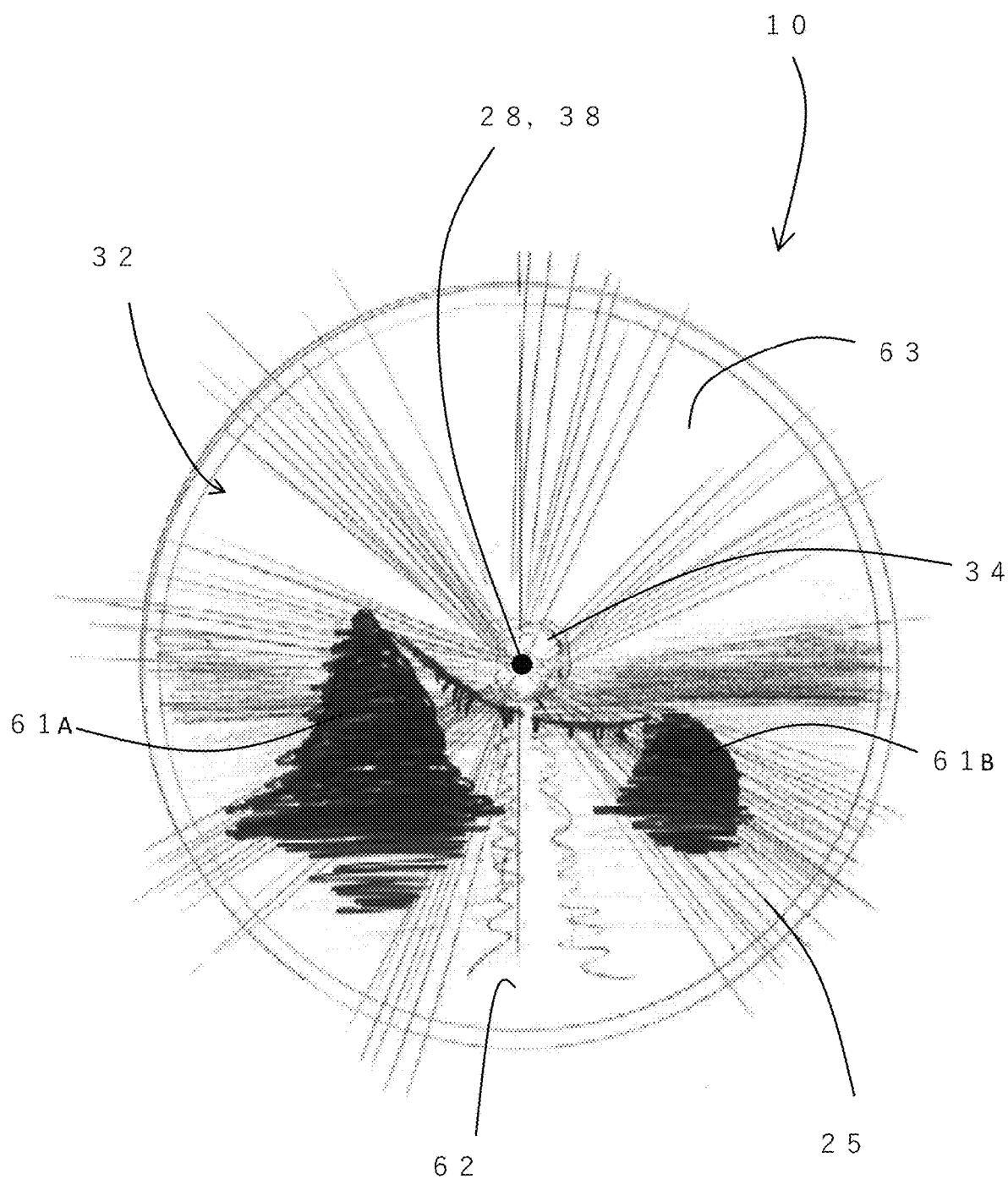
FIG. 5 is a plane view showing a first alternative example (sunset) of the subject image.

FIG. 5 shows a plane view of the badge 10 on which the subject image 32 according to a first alternative example is printed. In this subject image 32, a scene of sunset at the so-called Meotoiwa rock (rocks like a married couple) is drawn. The subject image 32 includes the light source image 34 (the sun). The radial center point 38 is defined in the light source image 34. As described above, the light source image 34, reef images 61A and 61B, a sea image 62, and a sky image 63 in the subject image 32 are all printed with light transmissive paints.

Figure 6:
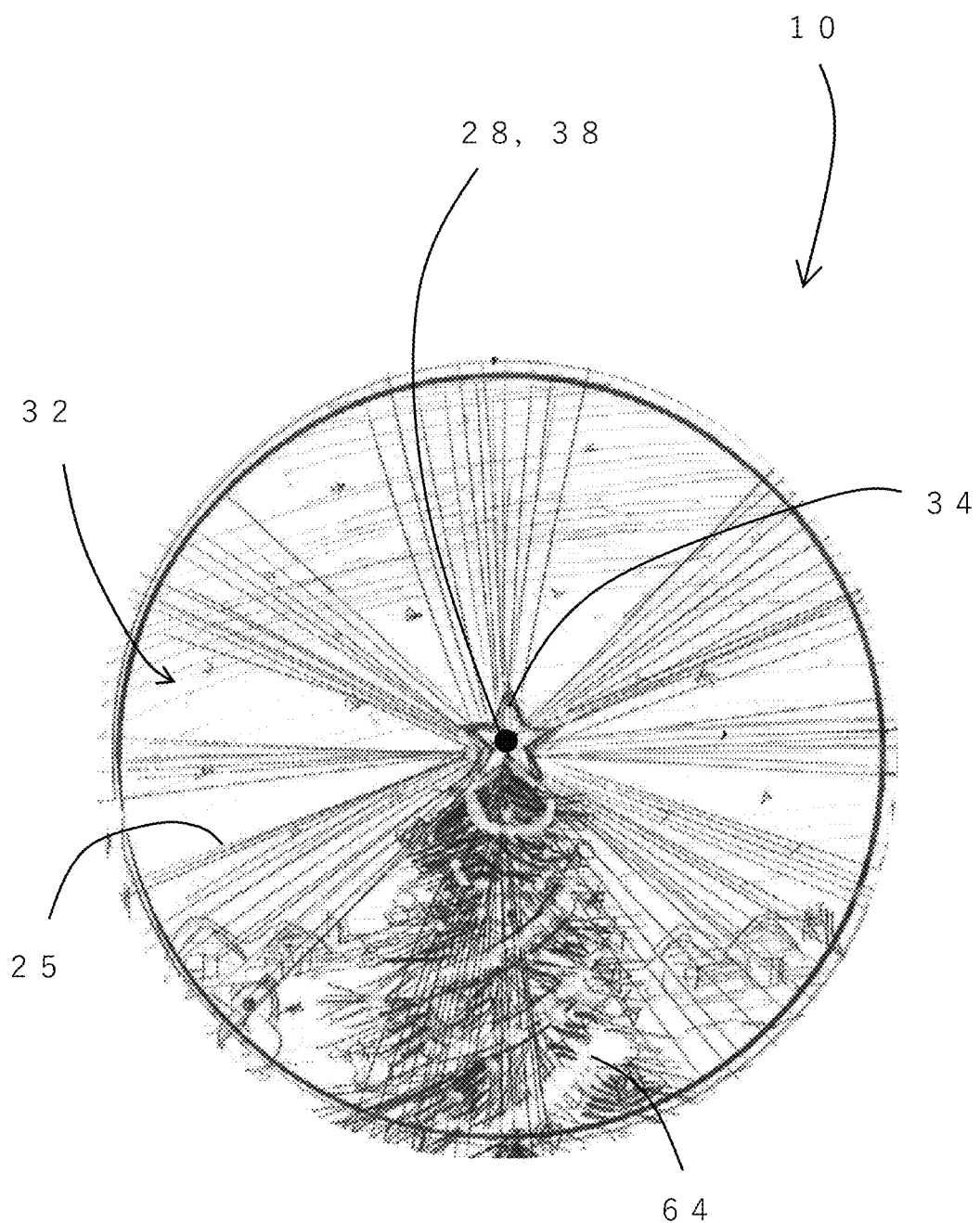
FIG. 6 is a plane view showing a second alternative example (Christmas tree) of the subject image.

FIG. 6 shows a plane view of the badge 10 on which the subject image 32 according to a second alternative example is printed. In this subject image 32, a scene of a star top of a Christmas tree shines is drawn. This subject image 32 includes the light source image 34 (star top). The radial center point 38 is defined in the light source image 34. As described above, the light source image 34, a tree image 64, and a background image in the subject image 32 are all printed with light transmissive paints.

In these examples, the print layer 30 (see FIG. 1) is also laminated on the circular brushed surface 22 side such that the circular processing center point 28 of the circular brushed surface 22 (see FIG. 2) and the radial center point 38 of the subject image 32 coincide with each other. Such alignment allows for a visual effect as if the light source image 34 (sun or star top) which is not a light emitter were emitting light.

Figure 7:
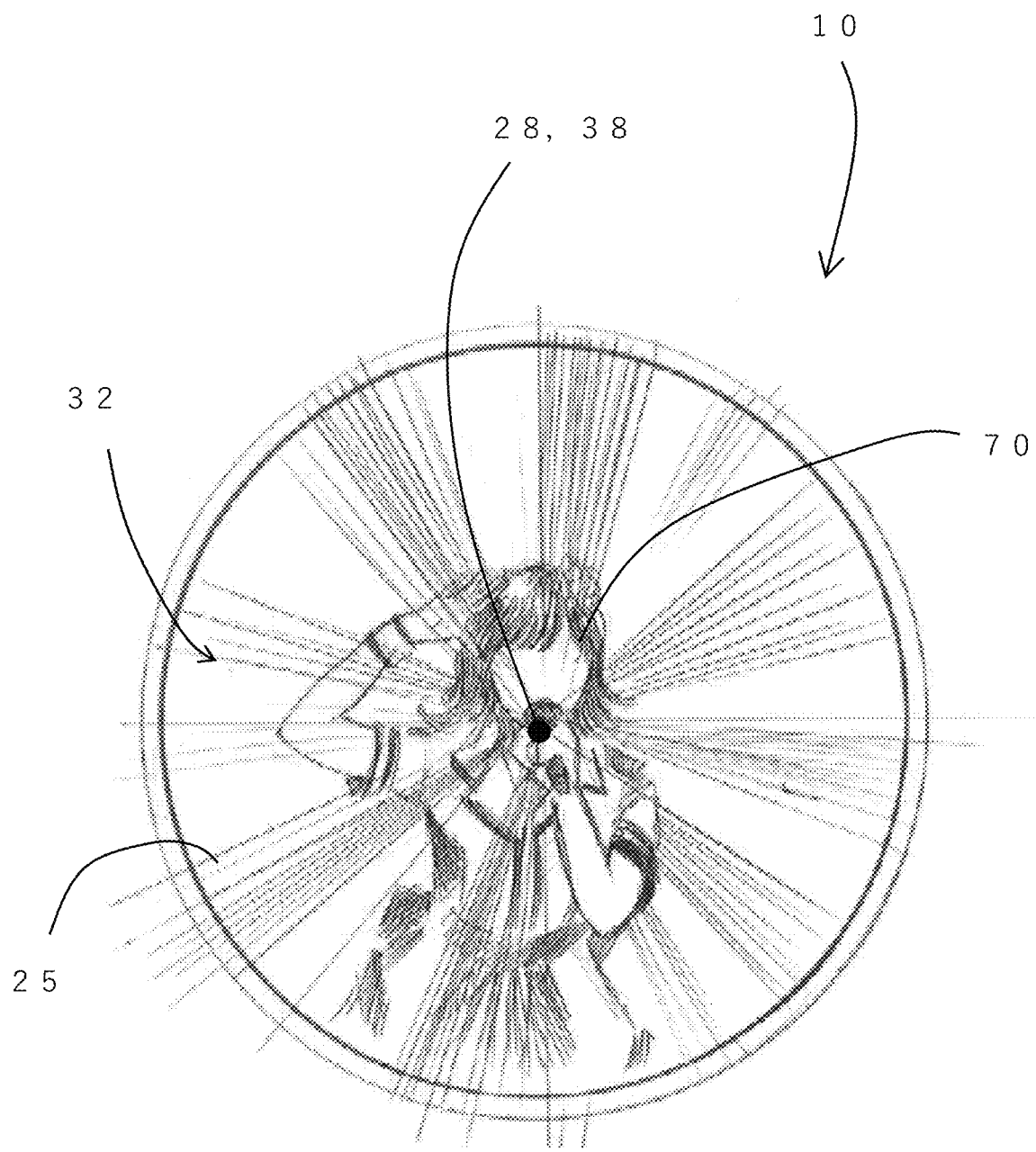
FIG. 7 is a plane view showing a third alternative example (idol) of the subject image.
Figure 8:
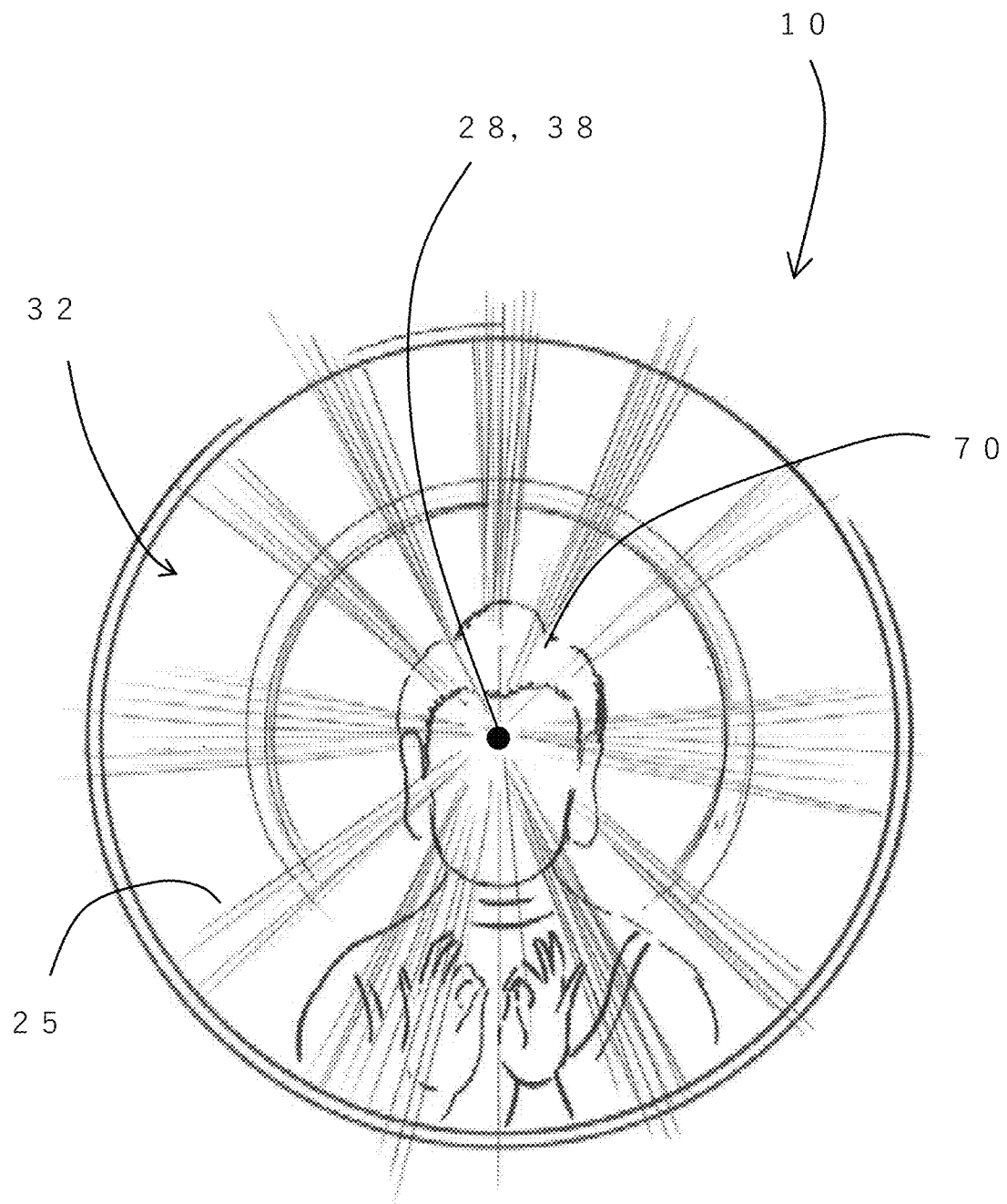
FIG. 8 is a plane view showing a fourth alternative example (Buddha statue) of the subject image.

FIG. 7 shows a plane view of the badge 10 on which the subject image 32 according to a third alternative example is printed. In this subject image 32, an idol image 70 (idol) is drawn. Further, FIG. 8 shows a plane view of the badge 10 on which the subject image 32 according to a fourth alternative example is printed. In this subject image 32, the idol image 70 (Buddha statue) is drawn.

In each of these subject images 32, the radial center point 38 is defined at a predetermined position with respect to the idol image 70. For example, in FIG. 7, the radial center point 38 is defined at the mouth of the idol image 70 (idol). In FIG. 8, the radial center point 38 is defined between the eyebrows of the idol image 70 (Buddha statue).

In these examples again, the print layer 30 (see FIG. 1) is laminated on the circular brushed surface 22 side such that the circular processing center point 28 of the circular brushed surface 22 (see FIG. 2) and the radial center point 38 of the subject image 32 coincide with each other. Such alignment allows for a visual effect as if the idol image 70 (idol, Buddha statue) were emitting a radiant glow (aura, bright rays) due to the optical radiation and diffusion effect caused by the circular brushed surface.

In the examples of FIGS. 7 and 8, radial lines do not have to be drawn on the subject image 32. As described above, the optical radiation and diffusion effect caused by the circular brushed surface dynamically changes the state of optical radiation and diffusion depending on the angle of light incidence and the angle from which the badge 10 is viewed. On the other hand, when radial lines are printed on the print layer 30, those radial lines remain at fixed positions in the subject image 32 regardless of the angle from which the badge 10 is viewed. By omitting these drawn radial lines from the print layer 30, it becomes possible to avoid the mixture of static and dynamic radial lines.

Figure 9:
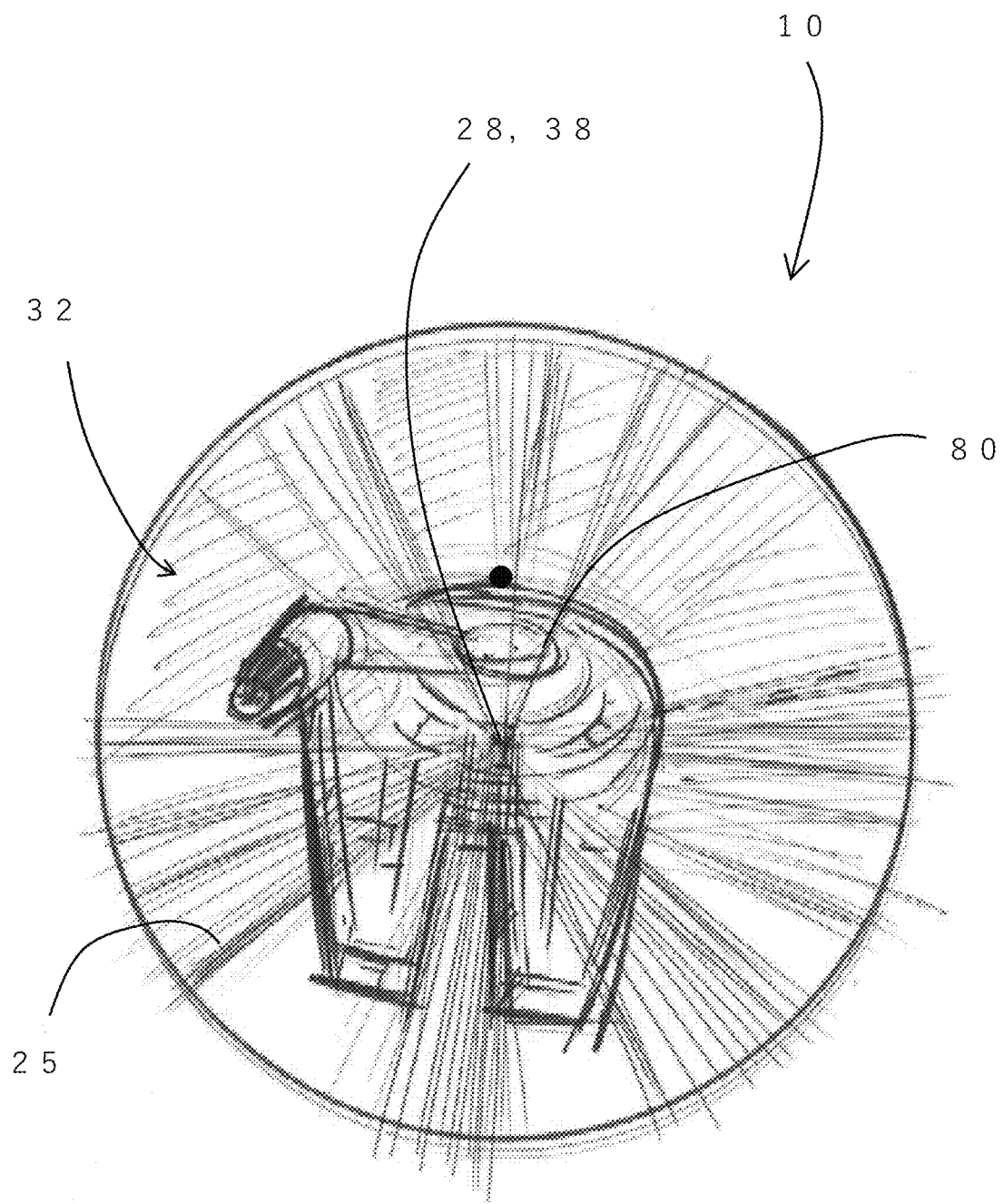
FIG. 9 is a plane view showing a fifth alternative example (spaceship) of the subject image.
Figure 10:
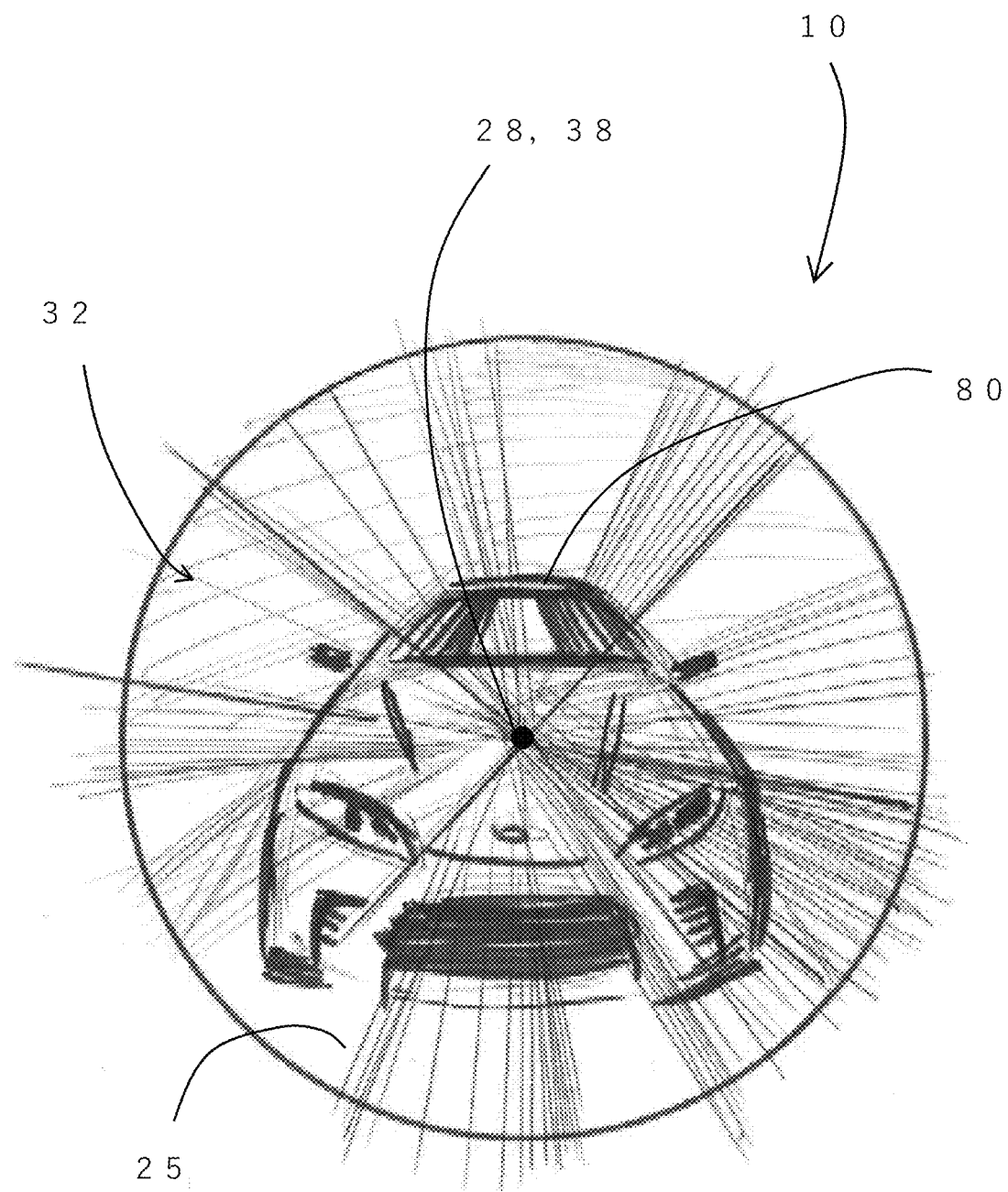
FIG. 10 is a plane view showing a sixth alternative example (vehicle) of the subject image.

FIG. 9 shows a plane view of the badge 10 on which the subject image 32 according to a fifth alternative example is printed. In this subject image 32, a moving body image 80 (spaceship) is drawn. FIG. 10 shows a plane view of the badge 10 on which the subject image 32 according to a sixth alternative example is printed. In this subject image 32, the moving body image 80 (vehicle) is drawn.

In each of these subject images 32, the radial center point 38 is defined at a predetermined position with respect to the moving body image 80. For example, in each of FIGS. 9 and 10, the radial center point 38 is defined at the center of the moving body image 80. In this case, the radial center point 38 is the center of radiation of the speed lines that are part of the effect lines.

In these examples again, the print layer 30 (see FIG. 1) is laminated on the circular brushed surface 22 side such that the circular processing center point 28 of the circular brushed surface 22 (see FIG. 2) and the radial center point 38 of the subject image 32 coincide with each other. Such alignment allows the speed lines from the moving body image 80 to be replaced or enhanced by the optical radiation and diffusion effect caused by the circular brushed surface. In these examples again, radial lines do not have to be drawn on the subject image 32.

In the examples in FIGS. 1 to 10, the three positions of the disk center point and the circular processing center point 28 of the substrate 20 (see FIG. 2), and the radial center point 38 of the subject image 32 are made to coincide with one another. However, the badge 10 according to the present embodiment is not limited to these examples.

Figure 11:
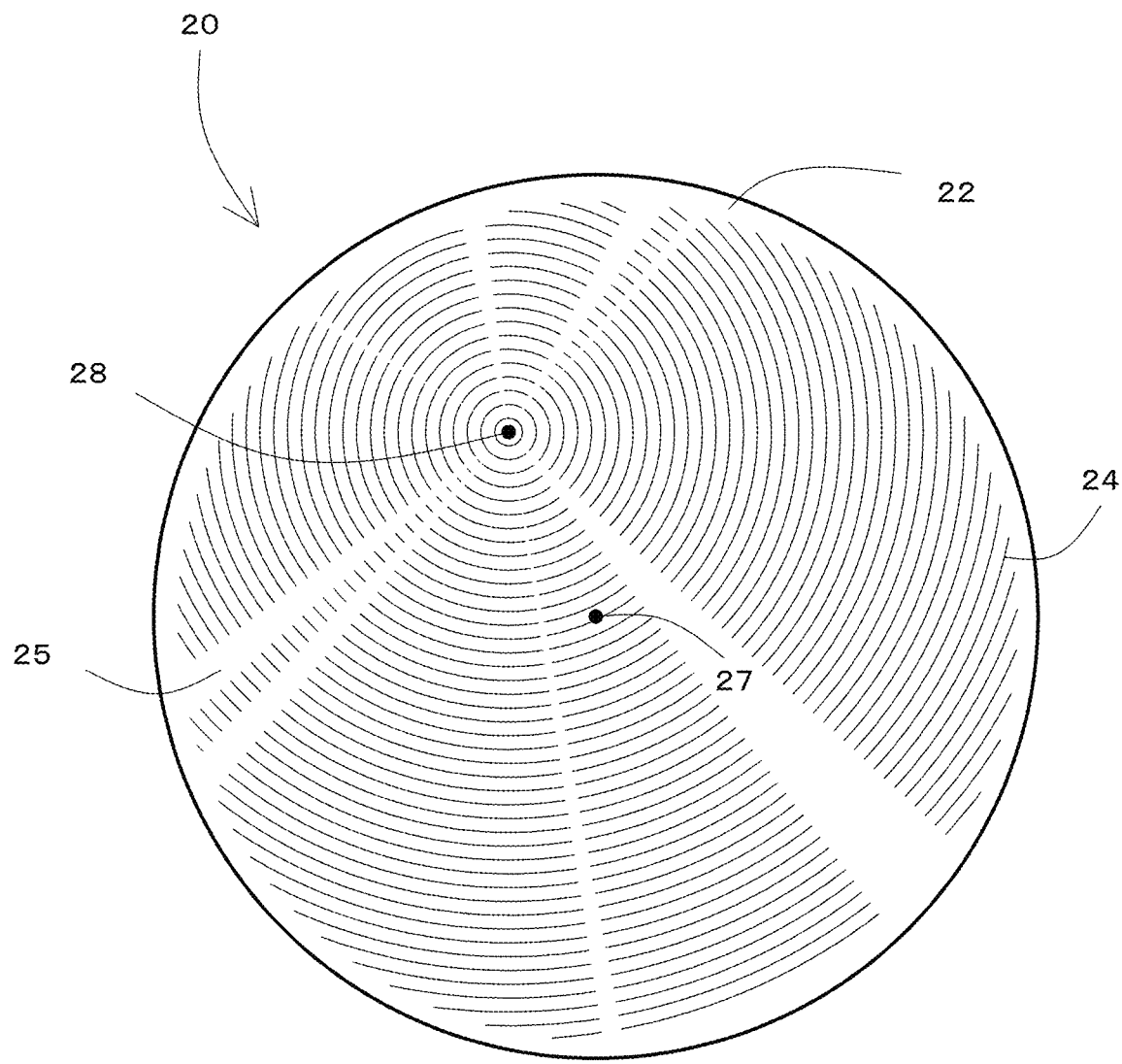
FIG. 11 is a plane view showing an example in which a circular processing center point is deviated from a disk center point.
Figure 12:
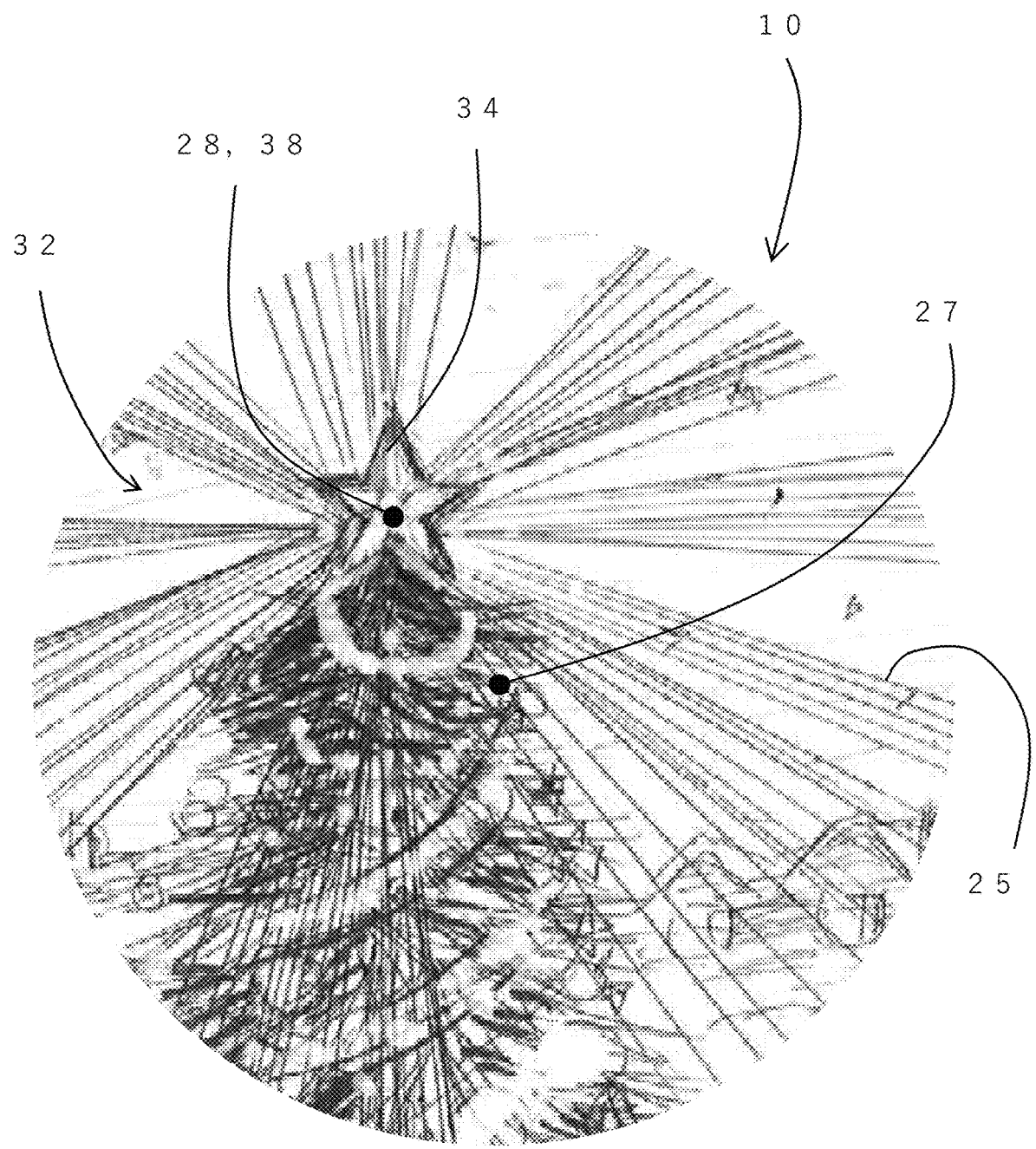
FIG. 12 is a plane view showing an example in which a radial center point of the subject image is defined at a position deviated from the disk center point.

FIG. 11 shows an example in which the position of the circular processing center point 28 of the circular brushed surface 22 of the substrate 20 is shifted from a disk center point 27. In this example, as shown in FIG. 12, the print layer 30 (see FIG. 1) is also laminated on the circular brushed surface 22 such that the positions of the circular processing center point 28 of the circular brushed surface 22 and the radial center point 38 of the subject image 32 coincide with each other. The radial center point 38 is thus positioned at a position deviated from the disk center point 27.

Figure 13:
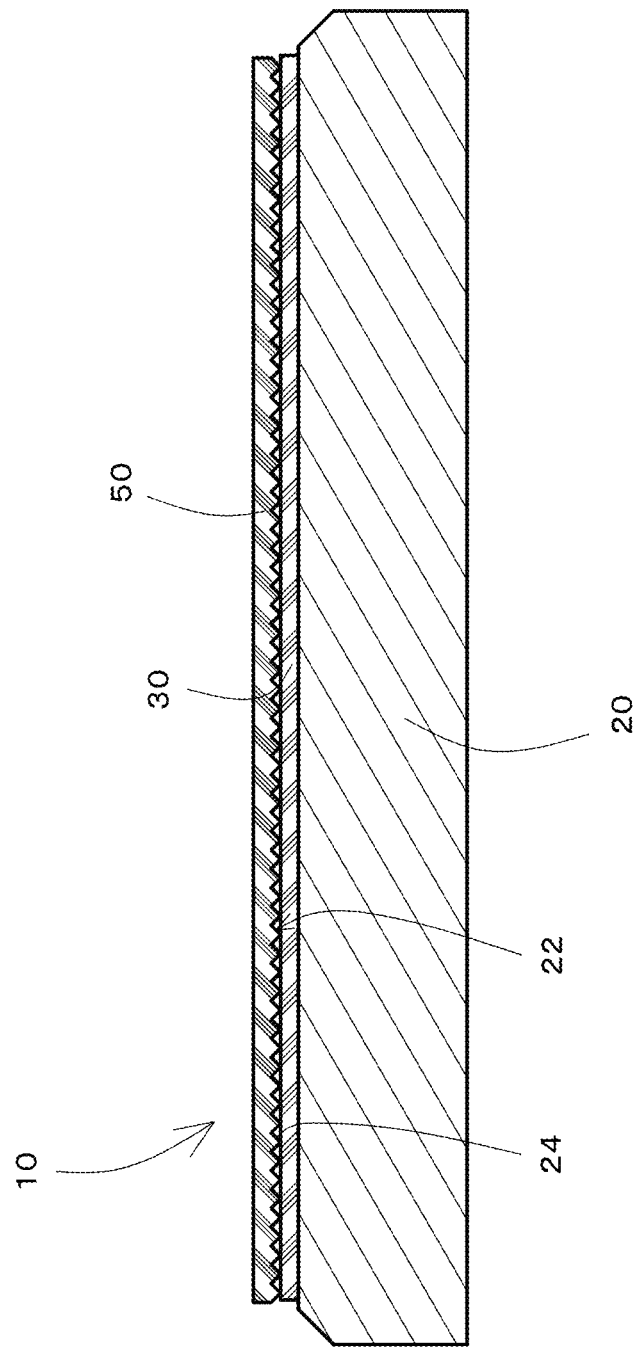
FIG. 13 is a cross-sectional view showing another example of the structure of the badge according to the embodiment.

Although, in the example of FIG. 1, the substrate 20 is illustrated as the processed layer having the circular brushed surface 22, the badge 10 according to the embodiment is not limited to this. FIG. 13 shows another example of the cross-sectional view of the badge 10.

In this example, the disk-shaped surface of the substrate 20 is not subjected to circular processing. Therefore, the disk-shaped surface of the substrate 20 is a smooth surface, and the intermediate protective layer 40 (see FIG. 1) is omitted. The print layer 30 is laminated directly on the disk surface.

The surface protective layer 50 is laminated on the print layer 30. The surface protective layer 50 is light transmissive as described above and may be, for example, a transparent, clear coat layer. In the example of FIG. 13, this surface protective layer 50 has the circular brushed surface 22. The substrate 50 can thus be regarded as a light transmissive processed layer.

For example, a surface of the surface protective layer 50 facing the print layer 30 is provided as the circular brushed surface 22. By providing the surface facing the print layer as the circular brushed surface 22 instead of an exposed surface of the surface protective layer 50, it is possible to prevent abrasion of the lines 24 during car washing or the like.

In addition, because the circular brushed surface 22 is formed in the layer on the print layer 30, the print layer 30 does not have to be light transmissive. For example, pigment paints are used for the print layer 30. The present disclosure is not limited to the present embodiments described above and includes all changes and modifications without departing from the technical scope or the essence of the present disclosure defined by the claims.

The invention claimed is:

1. A badge comprising:
a print layer printed with a subject image in which a radial center point is defined as a center point of a radial representation; and
a processed layer provided with a circular brushed surface subjected to circular processing and on which lines are formed in concentric circles or in a spiral pattern, wherein
the processed layer is a metallic substrate, on a glossy surface of which the circular brushed surface is formed,
the print layer is light transmissive, and
the print layer is laminated on the circular brushed surface such that the radial center point of the subject image and a circular processing center point that is a center point of the circular processing coincide with each other.

2. The badge according to claim 1, wherein
the subject image includes a light source image, and
the print layer and the processed layer are laminated such that the radial center point defined in the light source image and the circular processing center point coincide with each other.

3. The badge according to claim 1, wherein
the subject image includes an idol image, and
the print layer and the processed layer are laminated such that the radial center point defined with respect to the idol image and the circular processing center point coincide with each other.

4. The badge according to claim 1, wherein
the subject image includes a moving body image, and
the print layer and the processed layer are laminated such that the radial center point of radial speed lines defined with respect to the moving body image and the circular processing center point coincide with each other.

5. The badge according to claim 1, wherein
a light transmissive protective layer is laminated on the print layer.

6. The badge according to claim 1, wherein radial lines are not drawn on the print layer.

7. The badge according to claim 1, wherein
the print layer and the processed layer have a disk shape, and
the radial center point of the print layer and the circular processing center point of the processed layer are defined at a position shifted from disk center points of the print layer and the processed layer.

* * * * *